(12) United States Patent
White et al.

(10) Patent No.: US 7,865,784 B1
(45) Date of Patent: Jan. 4, 2011

(54) WRITE VALIDATION

(75) Inventors: Theodore C. White, Rancho Santa Margarita, CA (US); William W. Dennin, III, Mission Viejo, CA (US); Joseph G. Kriscunas, Dove Canyon, CA (US)

(73) Assignee: Marvell International Ltd., Hamilton (BM)

( * ) Notice: Subject to any disclaimer, the term of this patent is extended or adjusted under 35 U.S.C. 154(b) by 722 days.

(21) Appl. No.: 11/519,121

(22) Filed: Sep. 11, 2006

(51) Int. Cl.
*G06F 11/00* (2006.01)
(52) U.S. Cl. .................................. 714/53; 714/805
(58) Field of Classification Search ............... 714/53, 714/805
See application file for complete search history.

(56) References Cited

U.S. PATENT DOCUMENTS

| | | | |
|---|---|---|---|
| 3,599,146 A * | 8/1971 | Weisbecker | 714/805 |
| 5,537,425 A * | 7/1996 | Tsou | 714/805 |
| 5,802,080 A | 9/1998 | Westby | |
| 5,875,201 A * | 2/1999 | Bauman et al. | 714/800 |
| 6,457,067 B1 * | 9/2002 | Byers et al. | 710/3 |
| 6,715,036 B1 * | 3/2004 | Burton et al. | 711/118 |
| 6,772,289 B1 | 8/2004 | Corrigan | |
| 6,868,470 B1 | 3/2005 | Azimi et al. | |
| 6,934,902 B2 | 8/2005 | Hara et al. | |
| 6,941,493 B2 * | 9/2005 | Phelps | 714/53 |
| 6,954,807 B2 | 10/2005 | Shih | |
| 7,103,826 B2 * | 9/2006 | Thayer et al. | 714/763 |
| 2005/0174680 A1 | 8/2005 | Spaur et al. | |

* cited by examiner

*Primary Examiner*—Yolanda L Wilson

(57) ABSTRACT

A write validation system that includes a first address signature collector module that generates a first address signature that is indicative of a write address of data when the data is received at a memory control module. A second address signature collector module generates a second address signature that is indicative of the write address of the data when the data is transferred from the memory control module. An address signature validation module receives the first address signature from the first address signature collector module, receives the second address signature from the second address signature collector module, and compares the first address signature to the second address signature.

43 Claims, 9 Drawing Sheets

WRITE VALIDATION

FIELD

The present disclosure relates to validation of data, and more particularly to validation of data written to a specified location.

BACKGROUND

Various applications that include data transfer and/or processing may implement one or more data validation techniques to detect errors. Data corruption that occurs during data transfers and/or storage may cause protocol errors. For example, data corruption may affect link control frames, commands, and/or data. A storage controller, such as a hard disk controller (HDC), may apply validation techniques to data that is transferred from a host to an external buffer memory. Exemplary data validation techniques include, but are not limited to, cyclic redundancy check (CRC) validation, parity check validation, and error correcting code (ECC) validation.

Referring now to FIG. 1, an exemplary data transfer and storage system 10 that implements at least one of CRC validation, parity check validation, and ECC validation is shown. The system 10 includes a host 12, a memory controller 14, and an external memory 16. For example, the external memory 16 may be dynamic random access memory (DRAM), synchronous DRAM (SDRAM), and/or double date rate (DDR) RAM. The memory controller 14 transfers data from the host 12 to the external memory 16. For example, the memory controller 14 may be a direct memory access (DMA) controller that is located on an HDC 18.

Typically, the system 10 applies data validation, such as CRC validation, to the data that is transferred from the host 12 to the external memory 16 through the memory controller 14. For example, the HDC 18 may include a CRC module 20 that generates, applies, and checks CRC data. The HDC 18 may also apply data validation to data that is transferred to and from, as well as stored on, an internal memory 22 and/or a memory controller buffer 24. The internal memory 22 may be DRAM, SDRAM, or DDR RAM. The memory controller buffer 24 may be a first in, first out (FIFO) buffer.

SUMMARY

A write validation system comprises a first address signature collector module that generates a first address signature that is indicative of a write address of data when the data is received at a memory control module. A second address signature collector module generates a second address signature that is indicative of the write address of the data when the data is transferred from the memory control module. An address signature validation module receives the first address signature from the first address signature collector module, receives the second address signature from the second address signature collector module, and compares the first address signature to the second address signature.

In other features, the memory control module receives the data from at least one of a host and a write channel interface. The write channel interface is a direct memory access (DMA) interface. The memory control module is a random access memory (RAM) control module. An external memory receives the data from the memory control module. The external memory is at least one of synchronous dynamic RAM (SDRAM), double data rate (DDR) RAM, and flash memory. The memory control module includes a buffer memory. The buffer memory is a first in first out (FIFO) memory module.

In other features, the memory control module generates an address signature validation signal. The address signature validation module receives the address signature validation signal and compares the first address signature to the second address signature in response to the address signature validation signal. The address signature validation module generates at least one of an error signal and an interrupt signal when the first and second address signatures do not match. The address signature validation module generates a confirmation signal when the first and second address signatures match. The second address signature is based on write commands of the memory control module.

In other features, a hard disk control (HDC) module comprises the write validation system. A buffer control module includes the memory control module. The HDC module further comprises at least one of a cyclic redundancy check (CRC) module and an error correcting code (ECC) module.

A write validation system comprises first address signature collector means for generating a first address signature that is indicative of a write address of data when the data is received at a memory control module, second address signature collector means for generating a second address signature that is indicative of the write address of the data when the data is transferred from the memory control module, and address signature validation means for receiving the first address signature from the first address signature collector module, for receiving the second address signature from the second address signature collector module, and for comparing the first address signature to the second address signature.

In other features, the memory control module receives the data from at least one of a host and a write channel interface. The write channel interface is a direct memory access (DMA) interface. The memory control module is a random access memory (RAM) control module. The write validation system further comprises external memory means for receiving the data from the memory control module. The external memory means is at least one of synchronous dynamic RAM (SDRAM), double data rate (DDR) RAM, and flash memory. The memory control module includes buffer memory means for storing the data. The buffer memory means is a first in first out (FIFO) memory module.

In other features, the memory control module generates an address signature validation signal. The address signature validation means receives the address signature validation signal and compares the first address signature to the second address signature in response to the address signature validation signal. The address signature validation means generates at least one of an error signal and an interrupt signal when the first and second address signatures do not match. The address signature validation means generates a confirmation signal when the first and second address signatures match. The second address signature is based on write commands of the memory control module.

In other features, a hard disk control (HDC) module comprises the write validation system. A buffer control module includes the memory control module. The HDC module further comprises at least one of cyclic redundancy check (CRC) means and error correcting code (ECC) means for validating the data.

A write validation method comprises generating a first address signature that is indicative of a write address of data when the data is received at a memory control module, generating a second address signature that is indicative of the write address of the data when the data is transferred from the memory control module, receiving the first address signature and the second address signature, and comparing the first address signature to the second address signature.

In other features, the write validation method further comprises receiving the data from at least one of a host and a write channel interface. The write channel interface is a direct memory access (DMA) interface. The memory control module is a random access memory (RAM) control module. The write validation method further comprises receiving the data from the memory control module at an external memory. The external memory is at least one of synchronous dynamic RAM (SDRAM), double data rate (DDR) RAM, and flash memory. The memory control module includes a buffer memory. The buffer memory is a first in first out (FIFO) memory module.

In other features, the write validation method further comprises generating an address signature validation signal. The write validation method further comprises receiving the address signature validation signal and comparing the first address signature to the second address signature in response to the address signature validation signal. The write validation method further comprises generating at least one of an error signal and an interrupt signal when the first and second address signatures do not match. The write validation method further comprises generating a confirmation signal when the first and second address signatures match. The second address signature is based on write commands of the memory control module.

A computer program stored for use by a processor for operating a write validation method comprises generating a first address signature that is indicative of a write address of data when the data is received at a memory control module, generating a second address signature that is indicative of the write address of the data when the data is transferred from the memory control module, receiving the first address signature and the second address signature, and comparing the first address signature to the second address signature.

In other features, the computer program further comprises receiving the data from at least one of a host and a write channel interface. The write channel interface is a direct memory access (DMA) interface. The memory control module is a random access memory (RAM) control module. The write validation method further comprises receiving the data from the memory control module at an external memory. The external memory is at least one of synchronous dynamic RAM (SDRAM), double data rate (DDR) RAM, and flash memory. The memory control module includes a buffer memory. The buffer memory is a first in first out (FIFO) memory module.

In other features, the computer program further comprises generating an address signature validation signal. The write validation method further comprises receiving the address signature validation signal and comparing the first address signature to the second address signature in response to the address signature validation signal. The write validation method further comprises generating at least one of an error signal and an interrupt signal when the first and second address signatures do not match. The write validation method further comprises generating a confirmation signal when the first and second address signatures match. The second address signature is based on write commands of the memory control module.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
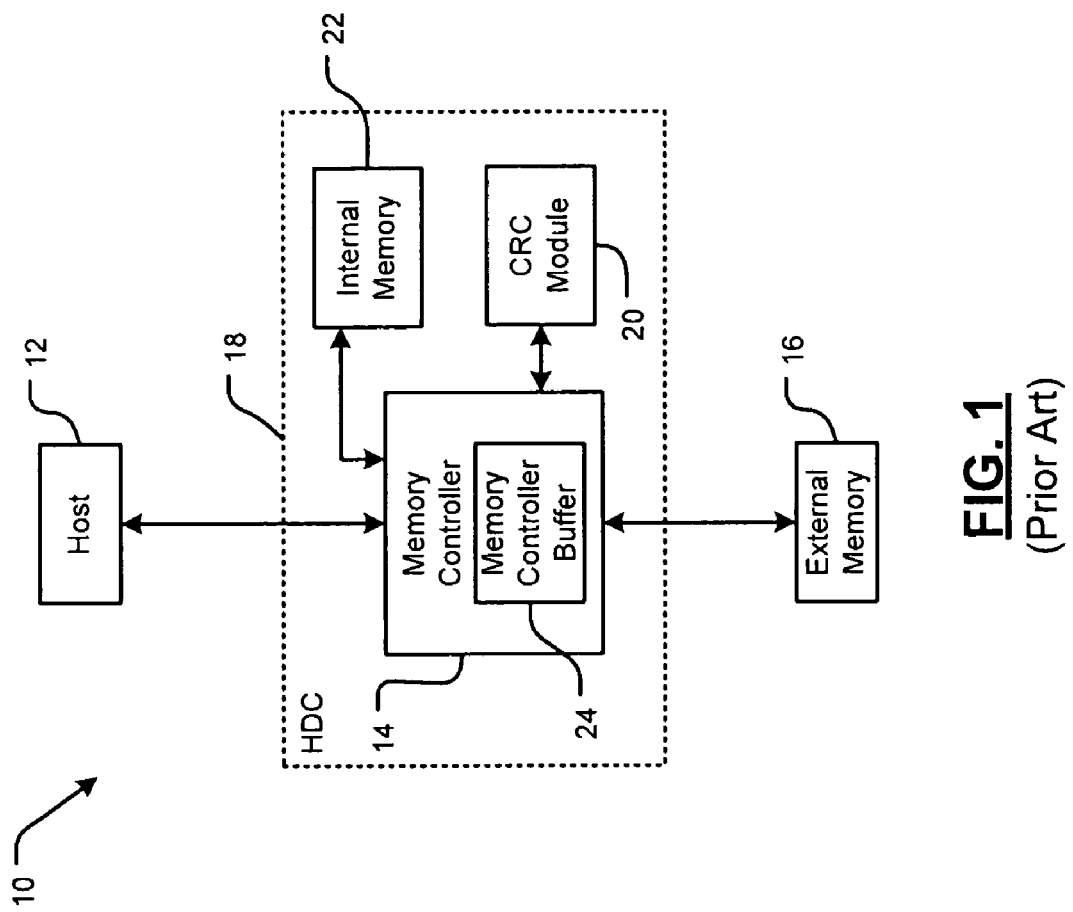
FIG. 1 is a functional block diagram of a memory controller according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Typically, data validation techniques such as CRC validation, ECC validation, and parity check validation are applied to the data to determine whether the actual data is corrupted. Data validation techniques do not determine whether the data is actually written to a memory or whether the data is written to the correct address in the memory. The present disclosure implements a write validation method that detects whether the data is actually written to a memory, and also whether the data is written to a desired memory location in the memory (e.g. an external buffer memory).

Figure 2:
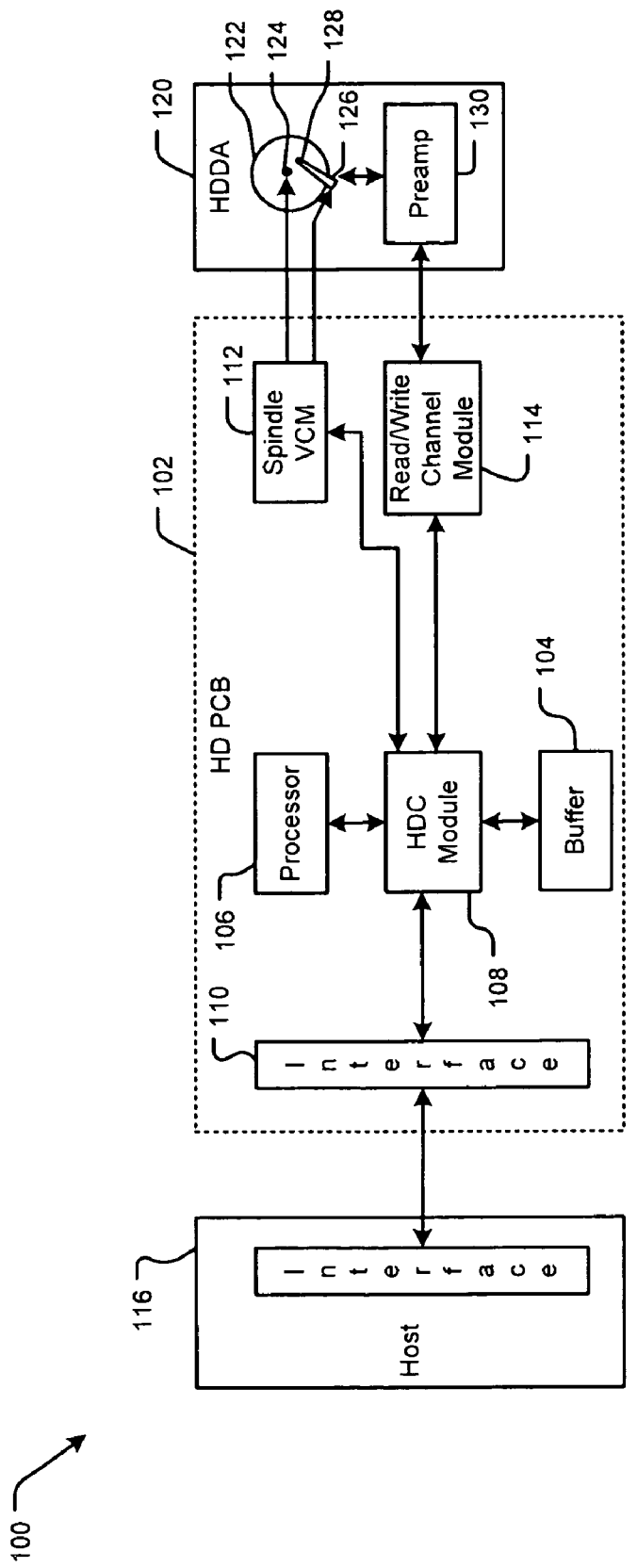
FIG. 2 is a functional block diagram of a hard disk drive (HDD) system according to the present disclosure.

Referring now to FIG. 2, an exemplary hard disk drive (HDD) system 100 that implements the write validation method of the present disclosure is shown to include a HDD printed circuit board (PCB) 102. A memory module such as buffer 104 stores read, write and/or volatile control data that is associated with the control of the HDD system 100, as well as application data. The buffer 104 usually employs volatile memory having low latency. For example, SDRAM, double data rate (DDR), or other types of low latency memory may be used. Nonvolatile memory such as flash memory may also be provided to store critical data such as nonvolatile control code.

A processor 106 arranged on the HDD PCB 102 performs data and/or control processing that is related to the operation of the HDD system 100. A hard disk control (HDC) module 108 communicates with an input/output interface 110, with a spindle/voice coil motor (VCM) driver or module 112, and/or a read/write channel module 114. The HDC module 108 coordinates control of the spindle/VCM module 112, the read/write channel module 114, and the processor 106 and data input/output with a host 116 via the interface 110. In the present implementation, the HDC module 108 applies the write validation method to data that is transferred between the host 116 and the buffer 104.

A hard disk drive assembly (HDDA) 120 includes one or more hard drive platters 122 that include magnetic coatings that store magnetic fields. The platters 122 are rotated by a spindle motor that is schematically shown at 124. Generally the spindle motor 124 rotates the hard drive platters 122 at a controlled speed during the read/write operations. One or more read/write arms 126 move relative to the platters 122 to read and/or write data to/from the hard drive platters 122. The spindle/VCM module 112 controls the spindle motor 124, which rotates the platter 122. The spindle/VCM module 112 also generates control signals that position the read/write arm 126, for example using a voice coil actuator, a stepper motor or any other suitable actuator.

During write operations, the read/write channel module 114 encodes the data to be written with a read/write device 128. The read/write channel module 114 processes the write signal for reliability and may apply, for example, error correction coding (ECC), run length limited coding (RLL), and the like. During read operations, the read/write channel module 114 converts an analog read signal output of the read/write device 128 to a digital read signal. The converted signal is then detected and decoded by known techniques to recover the data that was written on the platters 122.

The read/write device 128 is located near a distal end of the read/write arm 126. The read/write device 128 includes a write element such as an inductor that generates a magnetic field. The read/write device 128 also includes a read element (such as a magneto-resistive (MR) element) that senses the magnetic field on the platters 122. The HDDA 120 includes a preamplifier circuit or module 130 that amplifies the analog read/write signals. When reading data, the preamplifier module 130 amplifies low level signals from the read element and outputs the amplified signal to the read/write channel module 114. While writing data, a write current is generated that flows through the write element of the read/write device 128. The write current is switched to produce a magnetic field having a positive or negative polarity. The positive or negative polarity is stored by the hard drive platters 122 and is used to represent data.

The data is stored on the platters 122 in sectors. Each sector is byte structured and includes various fields according to a sector format. Typically, a sector format includes a logical block address (LBA) field followed by a data field, a cyclic redundancy check (CRC) checksum field, and/or an ECC field. For example, the LBA field may include 4 bytes of data, the data field may include 512 bytes of data, the CRC checksum field may include 4 bytes of data, and the ECC field may include 40-80 bytes of data. The LBA includes position information such as cylinder, head, and/or sector numbers.

Portions of the HDD system 100 may be implemented by one or more integrated circuits (IC) or chips. For example, the processor 106 and the HDC module 108 may be implemented by a single chip. The spindle/VCM module 112 and/or the read/write channel module 114 may also be implemented by the same chip as the processor 106, the HDC module 108 and/or by additional chips. Alternatively, most of the HDD system 100 other than the HDDA 120 may be implemented as a system on chip (SOC).

Figure 3:
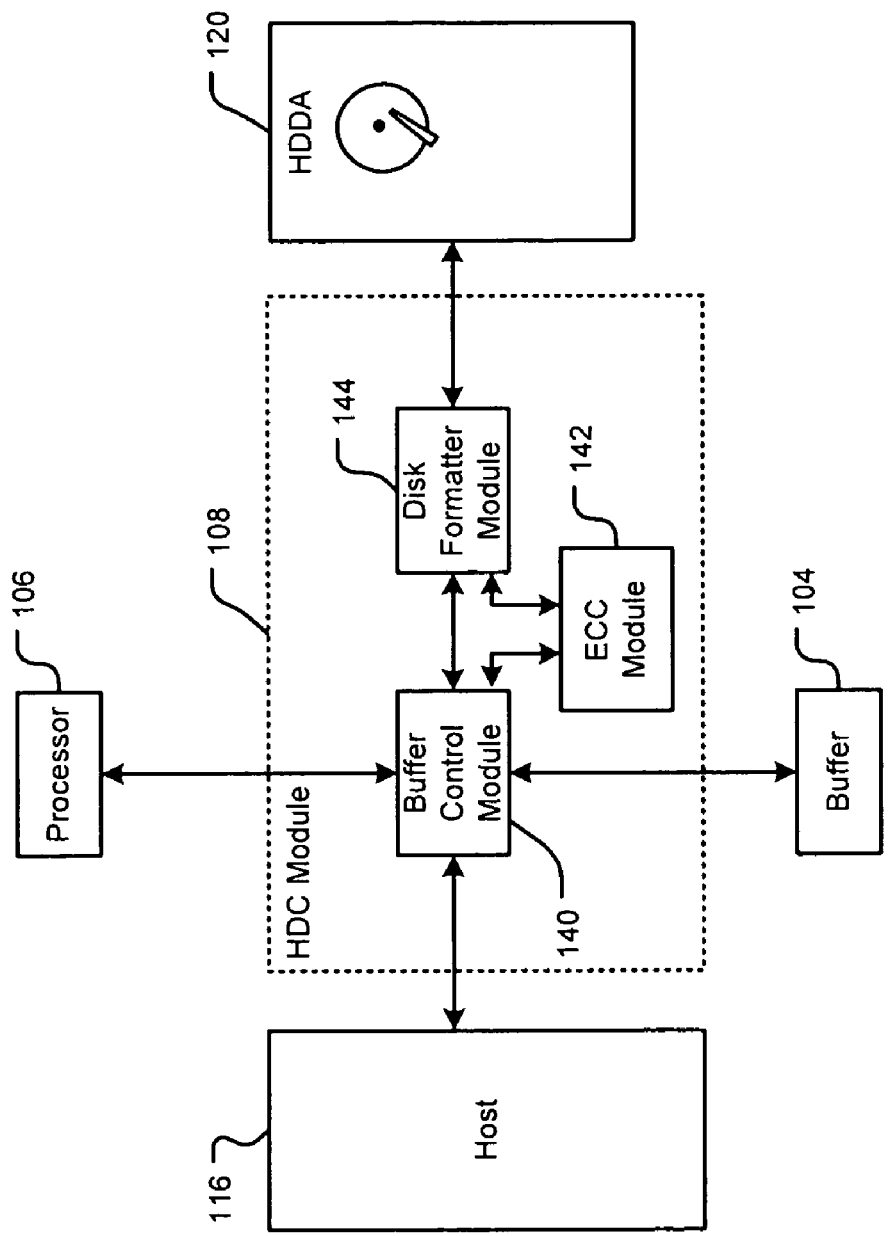
FIG. 3 is a functional block diagram of a hard disk control (HDC) module according to the present disclosure.

Referring now to FIG. 3, the HDC module 108 that implements the write validation method is shown in more detail. The HDC module 108 communicates with the buffer 104, the processor 106, the host 116, and the HDDA 120 as described in FIG. 2. The HDC module 108 includes a buffer control module 140, an ECC module 142, and a disk formatter module 144.

The buffer control module 140 (e.g. a direct memory access (DMA) controller) connects the buffer 104 to the disk formatter module 144, the ECC module 142, the host 116, the processor 106, and the HDDA 120. The buffer control module 140 regulates data movement in and out of the buffer 104.

The host 116 sends read and write commands to the HDC module 108. The HDC module 108 stores the read and write commands in the buffer 104. The processor 106 receives the read and write commands from the buffer 104 and executes firmware to control the HDC module 108 accordingly. During read operations, the HDC module 108 reads data corresponding to the read commands from the HDDA 120. The buffer control module 140 and the ECC module 142 receive the data from the HDDA 120. The ECC module 142 provides an ECC mask for errors that may have occurred during read operations while the data is still in the buffer control module 140. After any errors in the data are corrected, the data is transferred to the buffer 104. The data is then transferred from the buffer 104 to the host 116.

During write operations, the disk formatter module 144 controls writing of data to the HDDA 120. The buffer 104 receives data corresponding to the write commands via the HDC module 108. The disk formatter module 144 receives the data from the buffer 104 via the HDC module 108. The disk formatter module 144 formats the data for writing to the HDDA 120. For example, the disk formatter module 144 adds error correction codes to the data, monitors a position of the read/write heads, and writes the data to the read/write heads as described in FIG. 1.

The HDC module 108 (via the buffer control module 140) applies the write validation method to the data that is transferred to the buffer 104. For example, the buffer control module 140 receives the data from the host 116. The buffer control module 140 detects a desired location where the data is to be stored in the buffer 104. In other words, the data may include an address field that indicates a target storage location. In the present implementation, the buffer control module 140 detects the desired location and generates a write validation signature that is indicative of the desired location. Subsequently, the buffer control module 140 can determine whether the data was actually written to the desired location based on the write validation signature. In another implementation, the write validation signature may be generated when the data is initially is generated. In other words, the write validation signature may be predetermined before the buffer control module 140 receives the data.

Figure 4A:
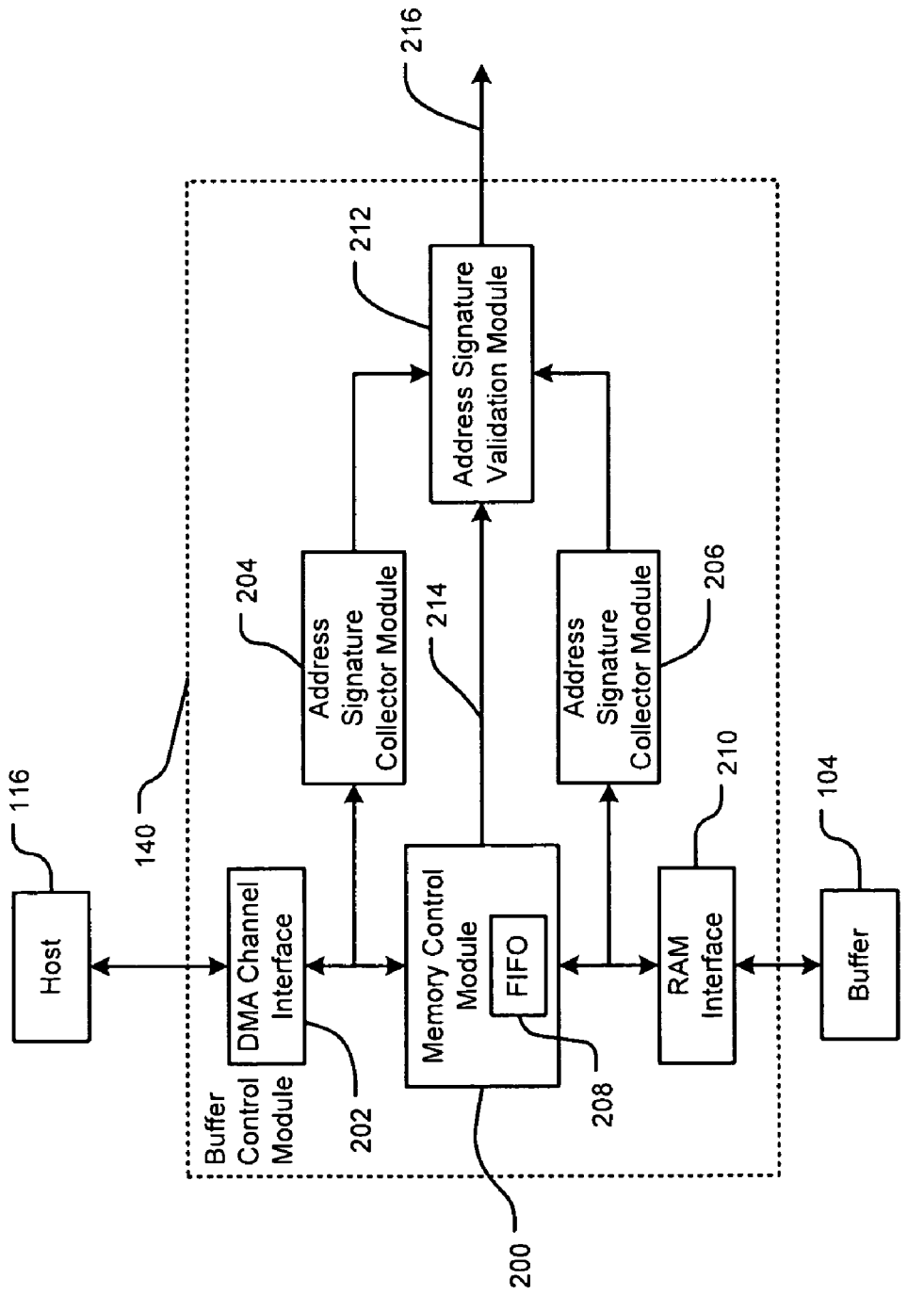
FIG. 4A is a functional block diagram of a buffer control module according to the present disclosure.

Referring now to FIG. 4A, the buffer control module 140 is shown to include a memory control module 200. For example, when the buffer 104 is DDR RAM, the memory control module 200 may be a DDR controller. The buffer control module 140 receives data from the host 116 via a communication interface such as a DMA channel interface 202. The memory control module 200 receives the data via the DMA channel interface 202 and transfers the data to and from the buffer 104.

The buffer control module 140 includes first and second address signature collector modules 204 and 206. The first address signature collector module 204 scans the data as it is transferred from the host 116 to the memory control module 200 via the DMA channel interface 202. The address signature collector module 204 generates and stores an address signature based on a destination write address included in the data. For example, the address signature collector module 204 may be located at a source of the write address in requestor logic of a particular channel of the DMA channel interface 202. In other words, a particular channel that is requesting a write operation generates the write address and includes a corresponding address signature collector module. In this manner, the address signature collector module 204 determines the address of each data word that is written to the memory control module 200 (e.g. that is written to a FIFO buffer 208).

The memory control module 200 communicates with the buffer 104 via a communication interface such as a RAM interface 210. The second address signature collector module 206 scans the data as it is transferred from the memory control module 200 to the buffer 104 via the RAM interface 210. The address signature collector module 206 generates and stores an address signature based on the write address of the data. For example, the address signature collector module 206 may be located at or near the RAM interface 210. In other words, during write operations to the buffer 104, both the first and second address signature collector modules 204 and 206 generate and store an address signature based on the write address of the data.

The first and second address signature collector modules 204 and 206 and the memory control module 200 communicate with a address signature validation module 212. The address signature validation module 212 receives the address signature from the first address signature collector module 204 as the data is transferred from the host 116 to the memory control module 200. The address signature validation module 212 receives the address signature from the second address signature collector module 206 as the data is transferred from the memory control module 200 to the buffer 104. The address signature validation module 212 may also determine a size of each memory access and a total amount of memory accesses.

The memory control module 200 communicates with the address signature validation module 212. The memory control module 200 generates an address signature validation signal 214. For example, the memory control module 200 may generate the address signature validation signal 214 periodically and/or conditionally. In the present implementation, the memory control module 200 generates the address signature validation signal 214 when requestor logic for a particular channel is not granted access to the buffer 104 (i.e. when a write operation is complete).

When the address signature validation module 212 receives the address signature validation signal 214, the address signature validation module 212 determines whether the address signature collector modules 204 and 206 generated the same address signature. When the address signatures are the same, the memory control module 200 is writing data to the correct locations in the FIFO buffer 208 and the buffer 104. Conversely, when the address signatures are not the same, the write address of the data is corrupted due to a defect and/or failure. For example, one or more defects in the HDC module 108, buffer control module 140, and/or the memory control module 200 may cause the write address to be corrupted. The address signature validation module 212 generates an error signal 216 to indicate that a defect has been detected. For example, the memory control module 200 may implement the error signal 216 as an interrupt. A determination that a particular write operation was successful may be contingent upon matching address signatures. For example, the address signature validation module 212 may generate a confirmation signal (not shown) when the address signatures match.

The HDD system 100 (as shown in FIG. 2) applies the write validation method as described in FIG. 4A to all write channels during memory accesses between power on and power off of the system 100. For example, the HDD system 100 includes the address signature collector modules 204 and 206 for any DMA channel that writes to the buffer 104 or another external buffer memory, including, but not limited to, channel 1, channel 0, XOR channels, microprocessor first-in-first-out (FIFO) memory channels, fiber channel (FC) and/or serial SCSI (SAS) search channels, and SDRAM FIFO/microprocessor logging channels. Further, the write validation method may be applied to any write application that includes specific write address data, including, but not limited to, random and sequential memory accesses. Those skilled in the art can appreciate that although the write validation method is particularly useful in HDD applications, other applications are anticipated.

Figure 4B:
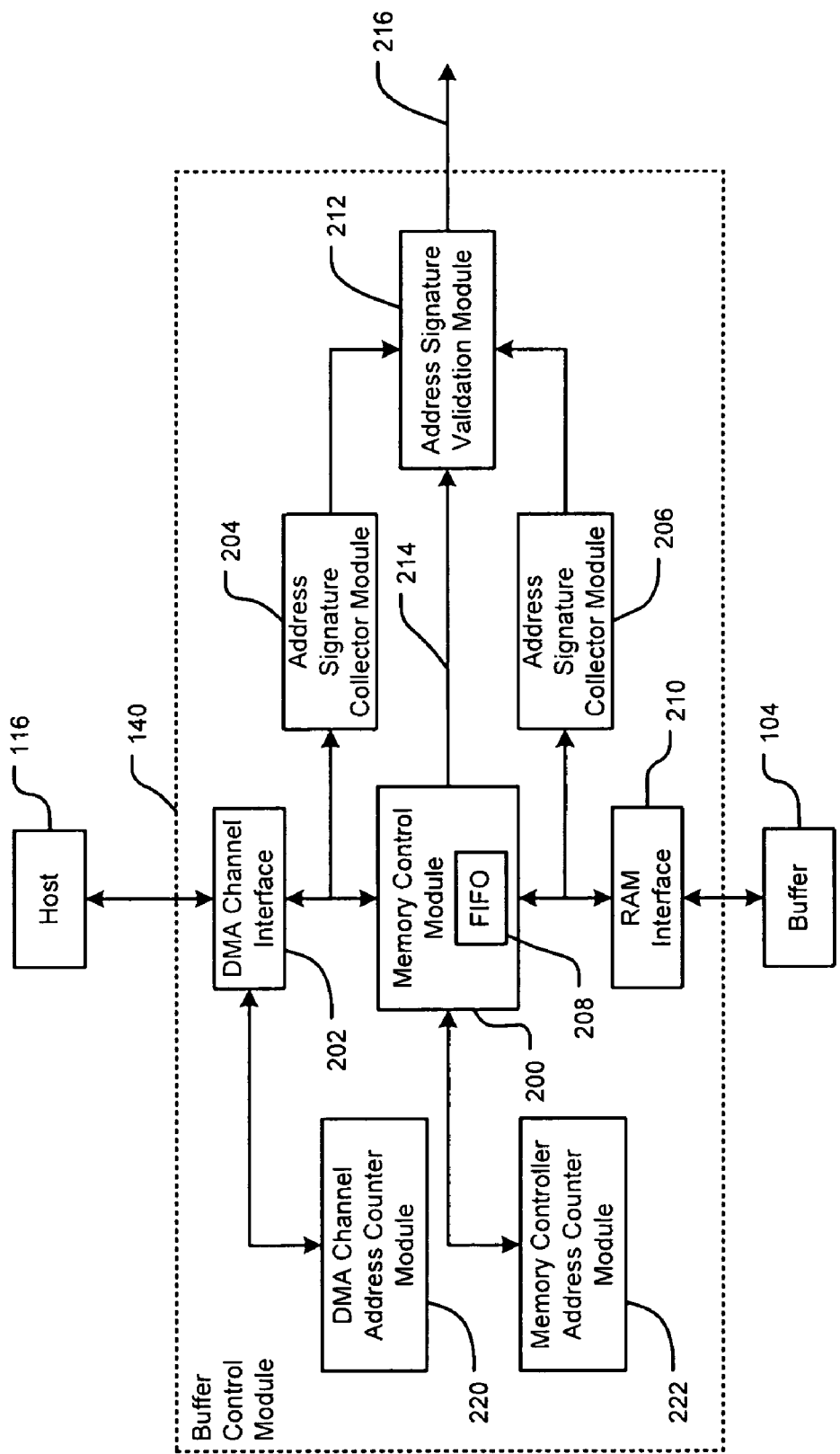
FIG. 4B is a functional block diagram of a buffer control module including an address counter module according to the present disclosure.

Referring now to FIG. 4B, the buffer control module 140 may include a DMA channel address counter module 220 and a memory controller address counter module 222. The DMA channel address counter module 220 generates a value that represents an initial address for each write burst of the memory control module 200, as well as byte addresses for each write operation included within the write burst. The first address signature collector module 204 receives the value from the DMA channel address counter module 220.

For example, the byte addresses are addresses that the memory control module 200 desires to write to and/or read from the buffer 104. The memory control module 200 converts each of the byte addresses into appropriate commands to access the buffer 104 (e.g. DDR commands to activate a page and/or access a selected column address within the page). The memory controller address counter module 222 generates a value that reflects actual write operations performed with respect to the buffer 104. In other words, the memory controller address counter module 222 generates the value based on commands to the buffer 104.

The second address signature collector module 204 receives the value from the memory controller address counter module 222. If the value from the memory controller address counter module 222 does not reflect an expected value based on the value from the DMA channel address counter module 220, the address signature validation module 212 generates the error signal 216.

Figure 5:
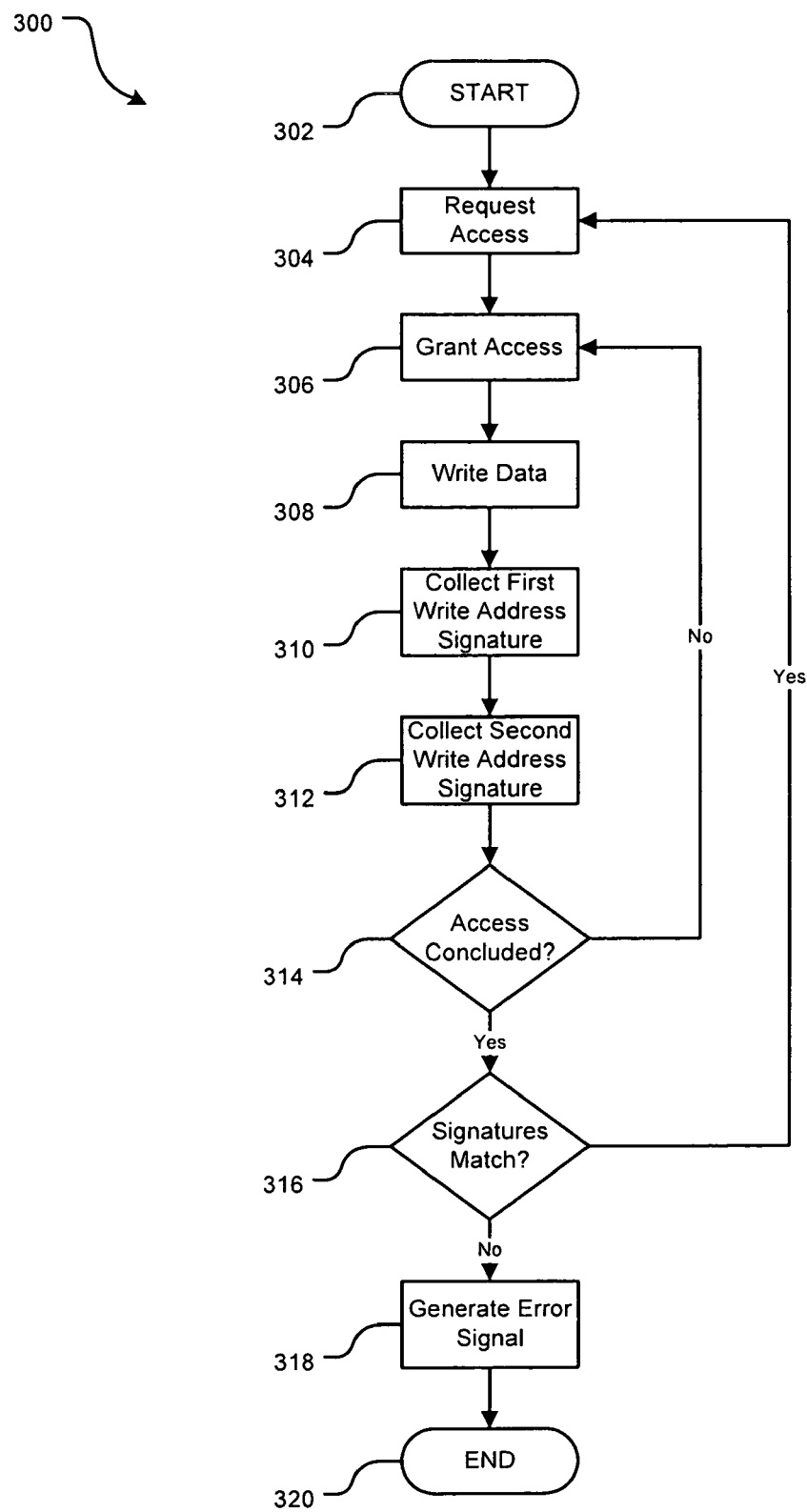
FIG. 5 is a flow diagram that illustrates steps of a write validation method according to the present disclosure.

Referring now to FIG. 5, a write validation method 300 begins in step 302. In step 304, requestor logic (such as DMA requestor logic) requests access to the buffer memory 104. In step 306, the buffer control module 140 grants buffer memory access to the requestor logic. In step 308, the buffer control module 140 writes data to the buffer memory 104 via a channel (e.g. a DMA channel) and the memory control module 200 (i.e. the requestor logic accesses the buffer memory 104).

In step 310, the first address signature collector module 204 collects a first write address signature from the data as the buffer control module 140 transfers the data to the memory control module 200. In step 312, the second address signature collector module 206 collects a second write address signature. For example, the second address signature collector module 206 collects the second write address signature as the data is transferred between the memory control module 200 and the buffer memory 104. In step 314, the buffer control module 140 determines whether the access is concluded. If true, the method 300 continues to step 316. If false, the method 300 repeats steps 308 through 314 and the buffer control module 140 continues to access the buffer memory 104.

In step 316, the address signature validation module 212 receives the first and second write address signatures and determines whether they match. If true (i.e. the first and second write address signatures match), the method 300 returns to step 304 and requestor logic (e.g. the same requestor logic or another requestor logic) requests access to the buffer memory 104. If false, the method 300 continues to step 318. In step 318, the buffer control module 140 generates an error and/or interrupt signal. For example, the address signature validation module 212 generates the error and/or interrupt signal. The method 300 terminates in step 320. Those skilled in the art can appreciate that the first and second address signature collector modules 104 and 106 may collect multiple pairs of write address signatures. For example, in step 316, the address signature validation module 212 may evaluate multiple pairs of write address signatures.

Figures 6A, 6B:
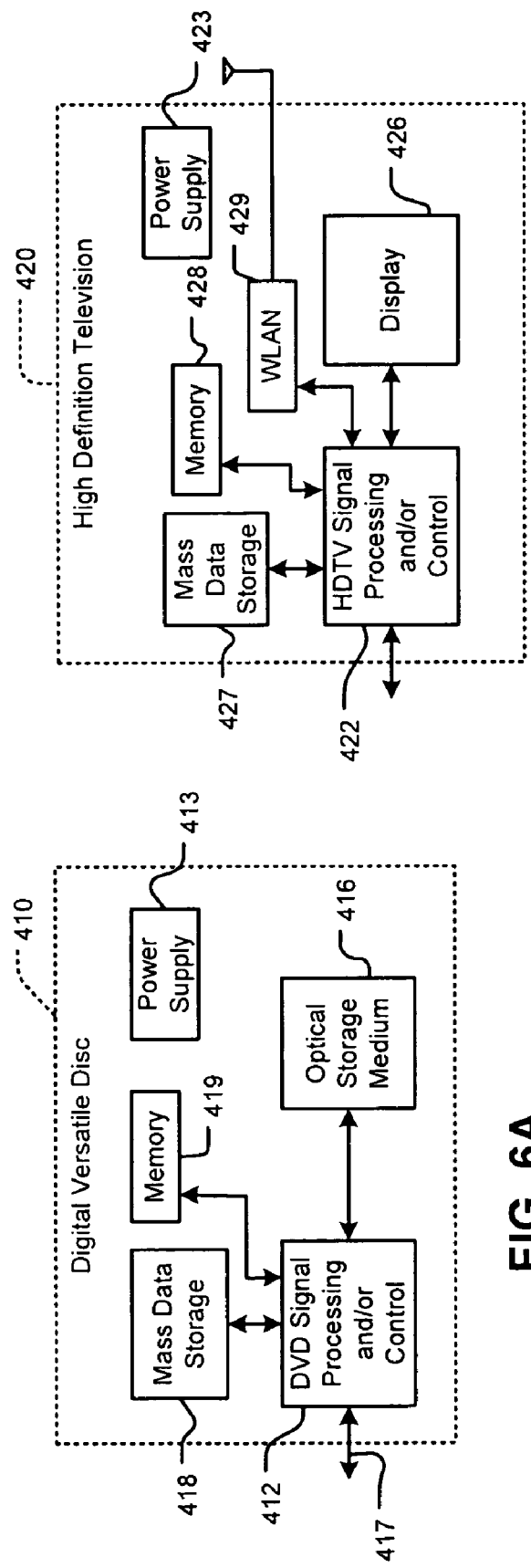
FIG. 6A is a functional block diagram of a digital versatile disk (DVD) drive.
FIG. 6B is a functional block diagram of a high definition television.

Referring now to FIGS. 6A-6F, various exemplary implementations of the write validation method are shown. Referring now to FIG. 6A, the write validation method can be implemented in a digital versatile disc (DVD) drive 410. In particular, mass data storage of the DVD drive 410 may implement the write validation method of the present disclosure. For example, the mass data storage of the DVD drive 410 may include a buffer memory that implements the write validation method.

The DVD drive 410 includes either or both signal processing and/or control circuits, which are generally identified in FIG. 6A at 412, mass data storage of the DVD drive 410, and a power supply 413. The signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD drive 410 may communicate with mass data storage 418 that stores data in a nonvolatile manner. The mass data storage 418 may include an HDD. The HDD may have the configuration shown in FIG. 2. The HDD may be a mini HDD that includes one or more platters having a diameter that is smaller than approximately 1.8". The DVD drive 410 may be connected to memory 419 such as RAM, ROM, low latency nonvolatile memory such as flash memory and/or other suitable electronic data storage.

Referring now to FIG. 6B, the write validation method can be implemented in a high definition television (HDTV) 420. In particular, mass data storage of the HDTV 420 may implement the write validation method. The HDTV 420 includes either or both signal processing and/or control circuits, which are generally identified in FIG. 6B at 422, a WLAN interface, mass data storage of the HDTV 420 and/or a power supply 423. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 2 and/or at least one DVD drive may have the configuration shown in FIG. 6A. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 6D:
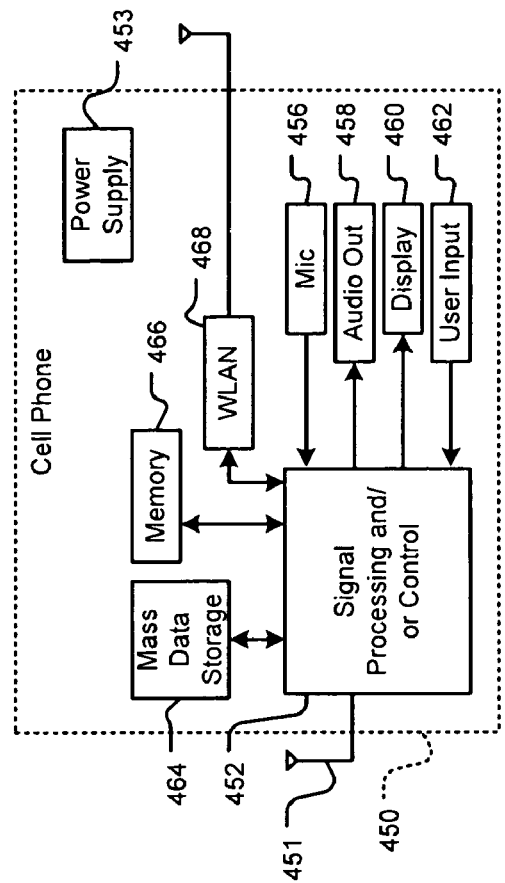
FIG. 6D is a functional block diagram of a cellular phone.
Figure 6C:
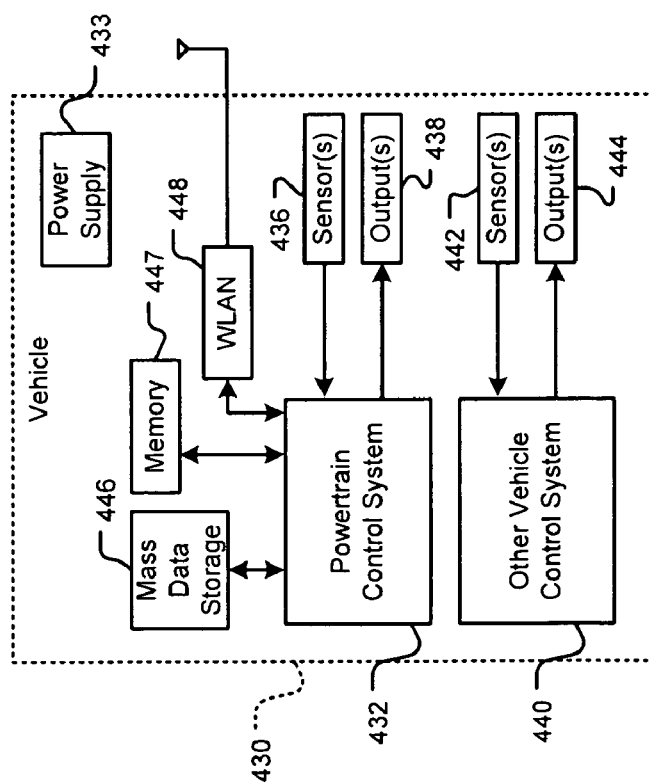
FIG. 6C is a functional block diagram of a vehicle control system.

Referring now to FIG. 6C, the write validation method can be implemented in a control system of a vehicle 430. In particular, mass data storage of the vehicle control system may implement the write validation method. The control system of the vehicle 430 includes a WLAN interface, mass data storage of the vehicle control system and/or a power supply 433. The vehicle 430 includes a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The write validation method may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD drive, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVD drives. At least one HDD may have the configuration shown in FIG. 2 and/or at least one DVD drive may have the configuration shown in FIG. 6A. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Referring now to FIG. 6D, the write validation method can be implemented in a cellular phone 450 that may include a cellular antenna 451. In particular, mass data storage of the cellular phone may implement the write validation method. The cellular phone includes either or both signal processing and/or control circuits, which are generally identified in FIG. 9D at 452, a WLAN interface, mass data storage of the cellular phone 450 and/or a power supply 453. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVD drives. At least one HDD may have the configuration shown in FIG. 2 and/or at least one DVD drive may have the configuration shown in FIG. 6A. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 6E:
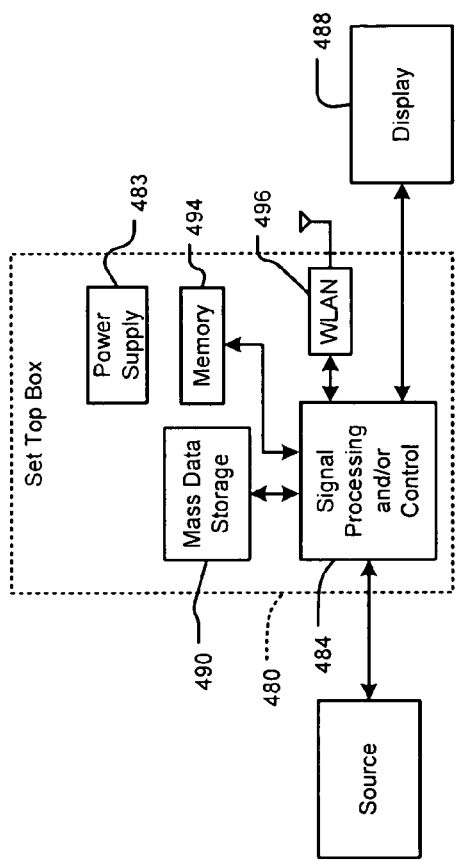
FIG. 6E is a functional block diagram of a set top box.

Referring now to FIG. 6E, the write validation method can be implemented in a set top box 480. In particular, mass data storage of the set top box 480 may implement the write validation method. The set top box 480 includes either or both signal processing and/or control circuits, which are generally identified in FIG. 6E at 484, a WLAN interface, mass data storage of the set top box 480 and/or a power supply 483. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVD drive. At least one HDD may have the configuration shown in FIG. 2 and/or at least one DVD drive may have the configuration shown in FIG. 6A. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 6F:
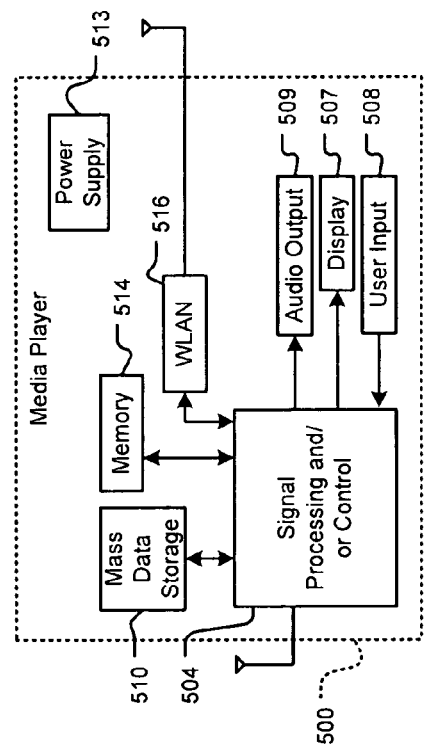
FIG. 6F is a functional block diagram of a media player.

Referring now to FIG. 6F, the write validation method can be implemented in a media player 500. In particular, mass data storage of the media player 500 may implement the write validation method. The media player 500 includes either or both signal processing and/or control circuits, which are generally identified in FIG. 6F at 504, a WLAN interface, mass data storage of the media player 500 and/or a power supply 503. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVD drives. At least one HDD may have the configuration shown in FIG. 2 and/or at least one DVD drive may have the configuration shown in FIG. 6A. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A write validation system, comprising: a first address signature collector module that generates a first address signature that is indicative of a write address of data when the data is received at a memory control module; a second address signature collector module that generates a second address signature that is indicative of the write address of the data when the data is transferred from the memory control module; and an address signature validation module that receives the first address signature from the first address signature collector module, that receives the second address signature from the second address signature collector module, and that compares the first address signature to the second address signature, wherein a hard disk control (HDC) module comprises the write validation system.

2. The write validation system of claim 1 wherein the memory control module receives the data from at least one of a host and a write channel interface.

3. The write validation system of claim 2 wherein the write channel interface is a direct memory access (DMA) interface.

4. The write validation system of claim 1 wherein the memory control module is a random access memory (RAM) control module.

5. The write validation system of claim 1 further comprising an external memory that receives the data from the memory control module.

6. The write validation system of claim 5 wherein the external memory is at least one of synchronous dynamic RAM (SDRAM), double data rate (DDR) RAM, and flash memory.

7. The write validation system of claim 1 wherein the memory control module includes a buffer memory.

8. The write validation system of claim 7 wherein the buffer memory is a first in first out (FIFO) memory module.

9. The write validation system of claim 1 wherein the memory control module generates an address signature validation signal.

10. The write validation system of claim 9 wherein the address signature validation module receives the address signature validation signal and compares the first address signature to the second address signature in response to the address signature validation signal.

11. The write validation system of claim 1 wherein the address signature validation module generates at least one of an error signal and an interrupt signal when the first and second address signatures do not match.

12. The write validation system of claim 1 wherein the address signature validation module generates a confirmation signal when the first and second address signatures match.

13. The write validation system of claim 1 wherein the second address signature is based on write commands of the memory control module.

14. The write validation system of claim 1 further comprising a buffer control module that includes the memory control module.

15. The write validation system of claim 14 further comprising at least one of a cyclic redundancy check (CRC) module and an error correcting code (ECC) module.

16. A write validation system, comprising: first address signature collector means for generating a first address signature that is indicative of a write address of data when the data is received at a memory control module;
second address signature collector means for generating a second address signature that is indicative of the write address of the data when the data is transferred from the memory control module; and
address signature validation means for receiving the first address signature from the first address signature collector means, for receiving the second address signature from the second address signature collector means, and for comparing the first address signature to the second address signature, wherein a hard disk control (HDC) module comprises the write validation system.

17. The write validation system of claim 16 wherein the memory control module receives the data from at least one of a host and a write channel interface.

18. The write validation system of claim 17 wherein the write channel interface is a direct memory access (DMA) interface.

19. The write validation system of claim 16 wherein the memory control module is a random access memory (RAM) control module.

20. The write validation system of claim 16 further comprising external memory means for receiving the data from the memory control module.

21. The write validation system of claim 20 wherein the external memory means is at least one of synchronous dynamic RAM (SDRAM), double data rate (DDR) RAM, and flash memory.

22. The write validation system of claim 16 wherein the memory control module includes buffer memory means for storing the data.

23. The write validation system of claim 22 wherein the buffer memory means is a first in first out (FIFO) memory module.

24. The write validation system of claim 16 wherein the memory control module generates an address signature validation signal.

25. The write validation system of claim 24 wherein the address signature validation means receives the address signature validation signal and compares the first address signature to the second address signature in response to the address signature validation signal.

26. The write validation system of claim 16 wherein the address signature validation means generates at least one of an error signal and an interrupt signal when the first and second address signatures do not match.

27. The write validation system of claim 16 wherein the address signature validation means generates a confirmation signal when the first and second address signatures match.

28. The write validation system of claim 16 wherein the second address signature is based on write commands of the memory control module.

29. The write validation system of claim 16 further comprising a buffer control module that includes the memory control module.

30. The write validation system of claim 29 further comprising at least one of cyclic redundancy check (CRC) means and error correcting code (ECC) means for validating the data.

31. A write validation method for a hard disk control (HDC) module, the write validation method comprising:
generating a first address signature that is indicative of a write address of data when the data is received at a memory control module located in the HDC module;
generating a second address signature that is indicative of the write address of the data when the data is transferred from the memory control module;
receiving the first address signature and the second address signature; and comparing the first address signature to the second address signature.

32. The write validation method of claim 31 further comprising receiving the data from at least one of a host and a write channel interface.

33. The write validation method of claim 32 wherein the write channel interface is a direct memory access (DMA) interface.

34. The write validation method of claim 31 wherein the memory control module is a random access memory (RAM) control module.

35. The write validation method of claim 31 further comprising receiving the data from the memory control module at an external memory.

36. The write validation method of claim 35 wherein the external memory is at least one of synchronous dynamic RAM (SDRAM), double data rate (DDR) RAM, and flash memory.

37. The write validation method of claim 31 wherein the memory control module includes a buffer memory.

38. The write validation method of claim 37 wherein the buffer memory is a first in first out (FIFO) memory module.

39. The write validation method of claim 31 further comprising generating an address signature validation signal.

40. The write validation method of claim 39 further comprising:
receiving the address signature validation signal; and
comparing the first address signature to the second address signature in response to the address signature validation signal.

41. The write validation method of claim 31 further comprising generating at least one of an error signal and an interrupt signal when the first and second address signatures do not match.

42. The write validation method of claim 31 further comprising generating a confirmation signal when the first and second address signatures match.

43. The write validation method of claim 31 wherein the second address signature is based on write commands of the memory control module.

* * * * *